United States Patent [19]

Crisp et al.

[11] Patent Number: 5,037,052
[45] Date of Patent: Aug. 6, 1991

[54] CLAMP ASSEMBLY SYSTEM

[76] Inventors: Joe E. Crisp, 650 Goose Creek Rd.; Ernest K. Delozier, 325 Sky Valley Cir., both of Seymour, Tenn. 37865

[21] Appl. No.: 342,223

[22] Filed: Apr. 21, 1989

[51] Int. Cl.⁵ ............................................. A47B 96/06
[52] U.S. Cl. ................................. 248/229; 248/288.3; 248/316.6
[58] Field of Search ................... 248/229, 231.6, 231.5, 248/288.3, 288.5, 481, 483, 316.6, 316.1; 135/90, 901; 403/90

[56] References Cited

U.S. PATENT DOCUMENTS

| | | |
|---|---|---|
| 688,230 | 12/1901 | Isgrig ............................. 248/229 X |
| 892,105 | 6/1908 | White . |
| 958,052 | 5/1910 | Williams . |
| 1,280,013 | 9/1918 | Goddard ....................... 248/288.5 X |
| 1,303,345 | 5/1919 | McFeaters .................... 248/288.5 X |
| 1,317,903 | 10/1919 | Whimster ..................... 248/288.5 X |
| 2,910,260 | 10/1959 | Tanner ................................ 248/181 |
| 3,843,083 | 10/1974 | Angibaud ........................ 248/229 A |
| 4,461,439 | 7/1984 | Rose ........................................ 248/51 |
| 4,813,341 | 3/1989 | Kepley ................................... 135/90 |

Primary Examiner—J. Franklin Foss
Attorney, Agent, or Firm—Luedeka, Hodges, Neely & Graham

[57] ABSTRACT

A system for supporting camouflage around a hunter situated in a tree utilizes a clamp assembly for supporting the camouflage in a stationary relationship with the tree. The clamp assembly is particularly well-suited for clamping branches about a tree stand and accommodates an adjustment in position of the clamped branches relative to the tree stand.

15 Claims, 2 Drawing Sheets

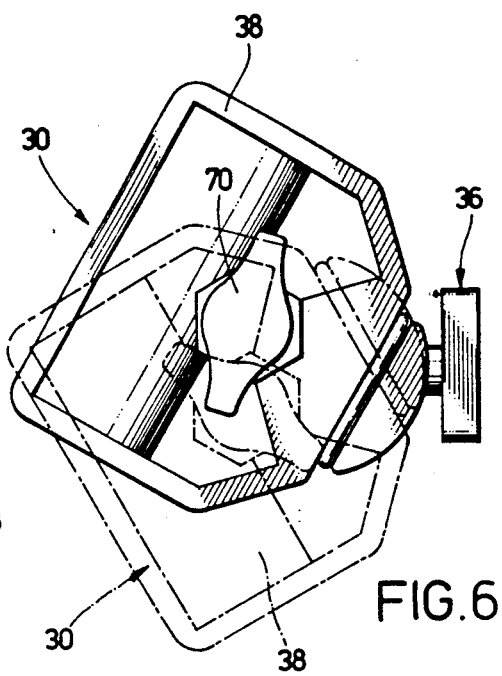
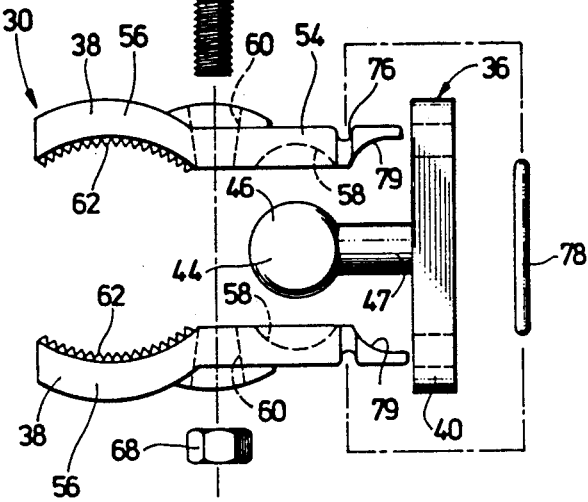
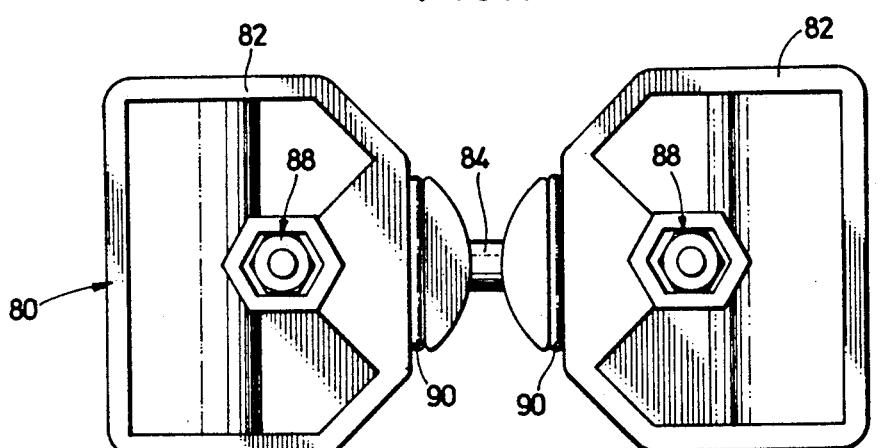

CLAMP ASSEMBLY SYSTEM

BACKGROUND OF THE INVENTION

This invention relates generally to sporting accessories and relates more particularly to a clamp assembly for clamping a sporting accessory in a stationary condition with respect to another object.

The type of application with which this invention is concerned involves the camouflaging of individuals from wild game and, in particular, involves the camouflaging of hunters situated in a tree.

Unless surrounded by a sufficient amount of foliage or camouflage material, hunters who are situated in trees are normally exposed to the view of approaching game. If, of course, a hunter is exposed to view of the game, the game may not approach close enough to the hunter for a shot to be taken. Therefore, it is desirable that a hunter situated in a tree be surrounded by a sufficient amount of camouflage or foliage.

Accordingly, it is an object of the present invention to provide a new and improved system for supporting camouflage, such as that provided by leafed tree branches, about a hunter when situated in a tree.

Another object of the present invention is to provide such a system which is well-suited for use with a hunter's tree stand.

Still another object of the present invention is to provide such a system which is uncomplicated in construction, easy to use and effective in operation.

Yet another object of the present invention is to provide a clamp assembly which is well-suited for clamping a sporting accessory, such as camouflage, in a stationary condition with respect to another object, such as a tree stand or tree.

SUMMARY OF THE INVENTION

This invention resides in a clamp assembly for supporting camouflage, such as leafed branches and the like, around a hunter situated in a tree. The clamp assembly includes a base adapted to be attached in a fixed relationship to a tree and grip means associated with the base. The grip means include gripping portions which are movable toward one another, and the clamp assembly further includes means for moving the gripping portions toward one another so that camouflage positioned between the gripping portions are tightly clamped in a stationary condition with respect to the base.

BRIEF DESCRIPTION OF THE DRAWINGS

FIG. 5 is a top plan view of the FIG. 2 clamp assembly as seen from above in FIG. 3 and shown exploded;

FIG. 6 is a plan view similar to that of FIG. 4 illustrating the grip elements of the clamp assembly when positioned in alternative positions;

FIG. 7 is a view similar to that of FIG. 3 illustrating an alternative clamp assembly; and FIG. 8 is a side elevational view of the FIG. 7 clamp assembly as seen from below in FIG. 7.

DETAILED DESCRIPTION OF THE ILLUSTRATED EMBODIMENTS

Figure 1:
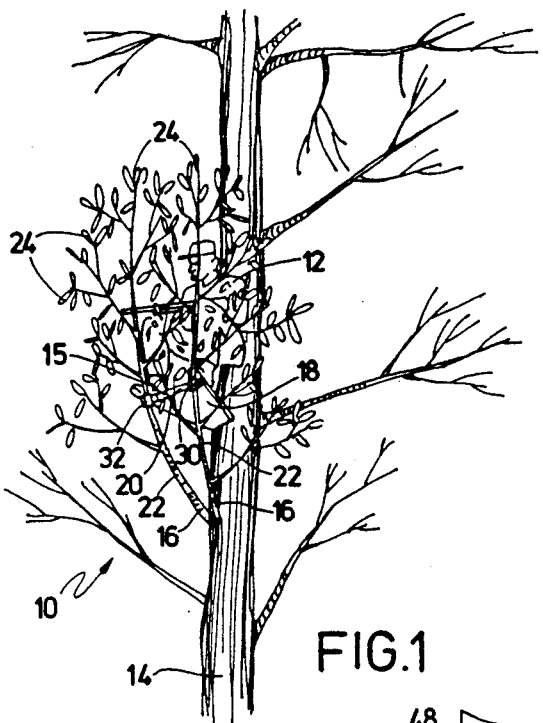
FIG. 1 is a perspective view of a system in accordance with the present invention utilized when camouflaging a hunter positioned in a tree.

Turning now to the drawings in greater detail, there is shown in FIG. 1 a camouflage support system 10 utilized for supporting camouflage around a hunter 12 who is situated in a tree 14. The hunter 12 is shown seated upon a wooden tree stand 15 which is, in turn, supportedly mounted in the tree 14. The camouflage supported by the system 10 includes limbs 16 held by the support system 10 in a stationary condition with respect to the tree stand 15. In practice, the limbs 16 provide a relatively natural-looking cover which disrupts the hunter's outline and to this extent hides the hunter from the view of approaching game.

The tree stand 15 includes a wooden platform 18 mounted in a conventional manner on the tree 14 and includes an end 20 which extends generally away from the trunk of the tree 14. Each limb 16 includes a primary branch 22 and a plurality of secondary, leafed branches 24 extending from the primary branch 22.

Figure 2:
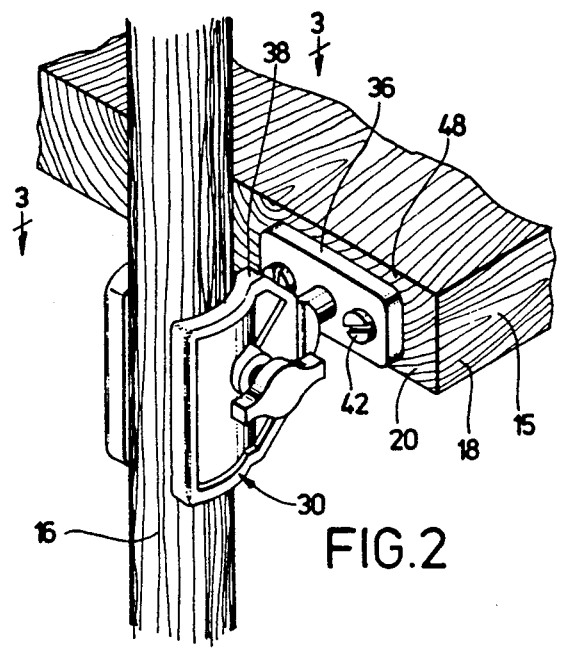
FIG. 2 is perspective view of a clamp assembly of the FIG. 1 system drawn to a slightly larger scale.

With reference to FIGS. 1 and 2, the system 10 includes a pair of clamp assemblies 30, 32 positioned at separate corners of the stand 15 for clamping the primary branch 22 of each limb 16 to the tree stand 15. More specifically, each clamp assembly 30, 32 is fixedly secured to the tree stand 15 at the end 20 thereof and supports a corresponding limb 16 so that the butt of each limb 16 rests against the tree trunk as shown in FIG. 1. With the limb 16 maintained in such a condition, some of the leafed branches 24 are positioned at about the horizontal level of the hunter 12 for camouflaging purposes.

Figure 3:
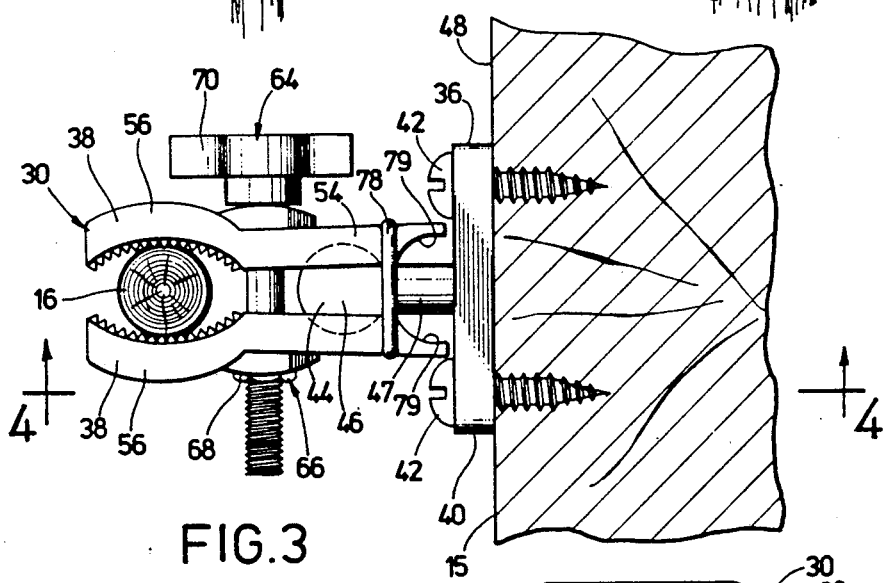
FIG. 3 is a cross-sectional view taken on line 3—3 of FIG. 2.
Figure 4:
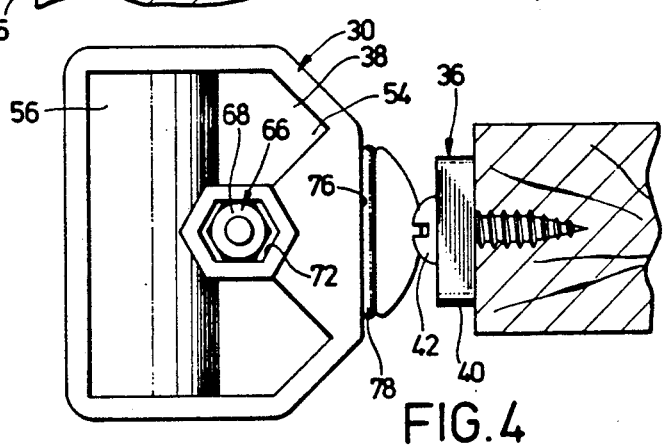
FIG. 4 is a cross-sectional view taken on line 4—4 of FIG. 3.

As exemplified by the clamping assembly 30 of FIGS. 2-5, each clamp assembly 30 or 32 includes a base 36 for attachment of the assembly to the tree stand 15 and a pair of grip elements 38, 38 for clamping a limb 16 to the base 36. As best shown in FIGS. 3 and 5, the base 36 includes a plate-like shoulder portion 40 and a knob 44 extending from the other side surface of the shoulder portion 40. The knob 44 includes a spherically-shaped end or ball 46 and a neck 47 joining the shoulder portion 40 and the ball 46. The base 36 is constructed of suitable material, such as a hard plastic, and the depicted base 36 is formed so that its shoulder portion 40 and knob 44 are integrally joined. A pair of holes are defined in the shoulder portion 40 for receiving a pair of screws 42 (FIG. 4).

The screws 42 facilitate the attachment of the base 36 to the tree stand 15. In the tree stand 15 of FIGS. 1-3, the screws 42 are screwed into a board 48 of the tree stand platform 18 at the end 20 thereof so that the shoulder portion 40 abuts the board 48. With the base 36 attached to the board 48 as aforedescribed, the knob 44 projects generally linearly from the platform end 20. It will be understood that the capacity of the base 36 to be readily attached to the wooden platform 18 of the tree stand 15 renders the base 36 capable of being attached directly to the body of the tree 14 for supporting limbs or the like adjacent the tree trunk.

With reference again to FIGS. 2-5, each grip element 38 includes a ball-engaging portion 54 and a jaw portion 56 extending from the ball-engaging portion 54. In the depicted assembly 30, each grip element 38 is constructed of a suitable material and its ball-engaging and jaw portions 54 and 56 are integrally formed. The ball-engaging portion 54 is platen-like in shape and forms with the jaw portion 56 somewhat of a five-sided component as viewed in FIG. 4. In addition, the ball-engaging portion 54 defines a shallow recess 58 which is positioned so as to open toward the shallow recess 58 of the other grip element 38. The recesses 58 each receive a portion of the ball 46 and are shaped complimentary to the surface of the ball 46 to accommodate, when desired, pivotal movement of the grip elements 38, 38 relative to and about the ball 46. For a purpose apparent herein, a through-opening 60 is disposed generally between the recess 58 and the jaw portion 56 of each portion 54 so that when the elements 38, 38 are operatively positioned on opposite sides of the ball 46 as shown in FIGS. 3 and 5, the through-openings 60, 60 are aligned.

The jaw portion 56 of each grip element 38 is arcuate in shape or C-shaped in cross section as viewed in FIGS. 3 and 5 and is relatively wide as measured from top to bottom in FIG. 4. The jaw portions 56, 56 are arranged so as to open toward one another and so that a branch of moderate thickness can be positioned therebetween. To facilitate the grasping of a branch by the jaw portions 56, each jaw portion includes a roughened interior surface 62. In the depicted assembly 30, each jaw surface 62 defines a plurality of teeth-forming serrations disposed across the surface 62 in a mosaic pattern.

Each clamp assembly 30 or 32 also includes means, indicated 64, for moving the grip elements 38, 38 toward one another so that the grip elements 38, 38 are tightenable about the ball 46 and branch 22. In the depicted assembly 30 of FIGS. 2-5, the moving means 64 includes a wing nut arrangement 66 having a nut 68 and a shanked wing nut 70. The shanked wing nut 70 is constructed by forming a wing nut about the head of a bolt and is positioned so that its shank extends through the aligned through-openings 60, 60 for receipt by the nut 68. As best shown in FIG. 4, the nut 68 is hexagon-shaped and cooperates with one of the grip elements 38 to prevent rotation of the nut 68 relative to the grip element 38 as the shanked wing nut 70 is tightened. In this connection, at least one grip element 38 or 38 defines a hexagonal recess 72 encircling the outer entrance of the through-opening 60 for nestingly receiving the nut 68 when the nut 68 is positioned therein. Thus, any attempted rotation of the nut 68 within the recess 72 is prevented by the walls of the recess 72. The shanked wing nut 70 is advantageous in that the spacer portion 74 provided between the surface of the grip element 38 and the formed wing nut facilitates the manual tightening or loosening of the wing nut 70.

It follows that with the ball-engaging portions 54 positioned on opposite sides of the ball 46 and the jaw portions 56 positioned on opposite sides of the tree branch 22, the ball-engaging portions 54, 54 and jaw portions 56, 56 are tightenable by means of the wing nut arrangement 66 about the ball 46 and branch 22, respectively, to securely clamp the branch 22 to the assembly base 36. When fully tightened, the grip elements 38, 38 frictionally grip both the branch 22 and ball 46 to prevent movement of the elements 38, 38 relative thereto.

Each clamping assembly 30 or 32 further includes means for biasing the jaw portions 56, 56 of the gripping elements 38, 38 from a closed condition toward an opened condition. In this connection, the grip elements 38, 38 define a groove 76, as best shown in FIG. 5, extending around one side of the ball-engaging portion 54. Furthermore, the groove 76 is positioned to one side of the ball-accepted recess 58 opposite the wing nut arrangement 66. Each assembly 30 or 32 further includes a rubber O-ring or similar elastomeric band 78 positioned in the groove 76 and about the grip elements 38, 38. The band 78 tightly encircles the ends of the ball-engaging portion 54, thereby elastically urging the encircled ends toward one another so that the jaw portions 56, 56 are biased away from one another with the ball 46 acting as a fulcrum.

The aforedescribed biasing of the jaw elements 38, 38 toward an opened condition provides an advantage in that the jaw portions 38, 38 are continually exerted outwardly against the wing nut 70 and the nut 68. Therefore, the grip elements 38, 38 are not permitted to move freely along the shank of the shanked wing nut 70 in a manner which may render difficult the positioning of the jaw portions 56, 56 about the branch 22.

Each clamp assembly 30 or 32 is further advantageous in that the grip elements 38, 38 can be adjusted in position relative to the base 36 to accommodate an altering of the positioning of a clamped branch relative to the base 36. More specifically, the grip elements 38, 38 can be pivoted about the ball 46 to accommodate the positioning of the grip elements 38, 38 through a relatively broad range of angular displacement. For example, one angular position of the grip elements 38, 38 relative to the base is shown in solid lines in FIG. 6 and another angular position of the grip elements 38, 38 is shown in phantom in FIG. 6. To accommodate a particularly wide range of angular displacement, each grip element 38 preferably includes an inclined surface 79 (FIGS. 3 and 5) on its end nearest the shoulder 36 so that opposing surfaces of the elements 38, 38 diverge outwardly relative to one another adjacent the neck 47, permitting closer movement of the elements 38, 38 toward the neck 47 and thus an extended swing of the outlying jaw portions 56, 56. It will be understood that in order to pivot the grip elements 38, 38 about the ball 46, the wing nut 70 must be loosened from a tightened condition to relieve the frictional engagement between the grip elements 38, 38 and the surface of the ball 46.

Illustrative dimensions of a clamp assembly 30 found to be well-suited for the purpose of clamping the branch 22 to a tree stand 15 are provided here as follows. The diameter of the shoulder portion 40 is about 1.0 inches (2.5 cm); the diameter of the ball 46 is about 0.75 inches (2.0 cm); the length of each grip element 38 as measured along the ball-engaging portion 54 and the jaw portion 56 is about 2.4 inches (6.1 cm); the width of each jaw portion 56 as measured from top to bottom in FIG. 4 is within the range of about 2.0 to 4.0 inches (5.1 to 10.2 cm), preferably about 2.5 inches (6.4 cm); and the radius of curvature of each jaw portion 56 is about 1.0 inches (2.5 cm). The material out of which the clamp assembly 30 is constructed may include a hard polyamide, or plastic, such as that identified by the trade designation Nylon and preferably includes an amount (e.g. 30 to 35 percent) which is glass fiber-reinforced.

It will be understood that numerous modifications and substitutions can be had to the aforedescribed embodiment without departing from the spirit of the invention. For example, although the base 36 of the assembly embodiments 30, 32 has been shown and described as requiring a threaded screw 42 for securement of the knob 44 to a tree stand or tree, a base 36 may take an alternative form for securement to a tree stand plank or branch. For example, there is illustrated in FIGS. 7 and 8 a clamp assembly 80 including two pairs of grip elements 82 joined by means of a two-ended member 84 for joining two limbs together. Each grip element 82 is similar in construction and shape to the grip element 38 of the clamp assembly 30 of FIGS. 1-6 for attachment, with its opposing element 82, about a limb, and the two-ended member 84 is provided with a ball 86 at each end thereof. As best shown in FIG. 7, each pair of grip elements 82 are positioned on opposite sides of the ball 86 and held thereagainst by means of a wing nut arrangement 88 and an elastomeric band 90. With its two pairs of grip elements, the clamp assembly 80 provides means by which one limb can be attached to another limb which has already been clamped or fixed in position about a hunter to contribute to the hunter's camouflage.

Furthermore, although the aforedescribed clamping assemblies 30, 32 have been described as add-on units capable of attachment to and detachment from a tree stand, a clamping assembly may be permanently affixed to a tree stand. In case of a metal tree stand, the clamping assembly may be affixed to the stand with bolts or welds. Although the aforedescribed system has been shown and described as being particularly well suited for supporting camouflage around a hunter situated in a tree, it will be understood that the clamping assembly may be utilized in other sporting applications which may require the clamping together of two sporting accessories. For example, the aforedescribed clamping system is believed to be useful for attaching fishing rods to boats. Accordingly, the aforedescribed embodiments are intended for purposes of illustration and not as limitation.

What is claimed is:

1. A clamp assembly for supporting camouflage such as leafed branches and the like around a hunter situated in a tree, said clamp assembly comprising:
   a base adapted to be attached in a fixed relationship to a tree;
   grip means including gripping portions which are mounted upon said base for movement toward one another and with respect to said base in frictional engagement therewith to engage camouflage between said gripping portions;
   means for holding and moving said gripping portions of said grip means toward one another so that camouflage may be tightly engaged between said gripping portions while causing said gripping portions to be frictionally engaged upon said base sufficient to prevent movement of said gripping portions with respect to said base to thereby hold the camouflage in a stationary position with respect to the base; and
   bias means for opposing movement of said gripping portions toward one another so that said bias means and said means for holding and moving cooperate to restrict movement of said gripping portions on said base when said gripping portions are not tightly engaged upon the camouflage.

2. A clamp assembly as defined in claim 1 wherein said grip means are movable relative to the base to accommodate an adjustment in position of the camouflage relative to the base.

3. A clamp assembly as defined in claim 2 wherein said base includes a spherically-shaped portion and said grip means cooperates with said spherically-shaped portion to permit an adjustment in position of the grip means relative to the base.

4. A clamp assembly as defined in claim 1 wherein said grip means includes a pair of grip elements, each grip element includes a jaw which is movable toward or away from the jaw of the other grip element, and said gripping portions are provided by the jaws of said grip elements.

5. A clamp assembly as defined in claim 4 wherein each of said jaws is substantially C-shaped in cross-section and said jaws are arranged so that the Cs open generally toward one another.

6. A clamp assembly as defined in claim 4 wherein said jaws are relatively wide for gripping a piece of camouflage for a substantial distance along its length.

7. A clamp assembly as defined in claim 4 wherein at least one of said jaws includes a surface which is roughened to facilitate the grasping of a piece of camouflage by the jaws.

8. A clamp assembly as defined in claim 1 wherein said moving means includes a bolt associated with said grip means and a nut which is threaded upon an end of the bolt so that tightening of the nut upon the bolt moves said gripping portions toward one another.

9. A clamp assembly as defined in claim 8 wherein said grip means cooperates with said bolt to prevent said bolt from rotating as said nut is tightened.

10. A clamp assembly as defined in claim 1 wherein said moving means is connected to said grip means so that as said moving means moves said gripping portions toward one another to clamp camouflage therebetween, the gripping portions are tightened about the base.

11. A clamp assembly as defined in claim 1 wherein said grip means is a first grip means and said base includes a second grip means having gripping portions which are movable toward one another and means for moving the gripping portions of said second grip means toward one another for tightly clamping said base in a stationary relationship to a tree or other fixed structure.

12. A clamp assembly as defined in claim 11 wherein said base includes a two-ended member having a spherically-shaped portion at each end and each of said grip means cooperates with a spherically-shaped portion at a corresponding end of said two-ended member to permit an adjustment in position of the corresponding grip means relative to the two-ended member.

13. A clamp assembly for supporting camouflage such as leafed branches and the like around a hunter situated in a tree, said clamp assembly comprising;
   a base adapted to be attached in a fixed relationship to a tree;
   grip means associated with the base and including gripping portions which are movable toward one another;
   means for moving said gripping portions toward one another so that camouflage positioned between said gripping portions can be tightly clamped in a stationary condition with respect to the base, wherein said grip means includes a pair of elongate grip elements and said gripping portions are provided at one end of said grip elements, said base includes a spherically-shaped portion and said grip elements are positioned about said spherically-shaped portion so that opposite ends of said grip elements are positioned on opposite sides of the spherically-shaped portion, and said biasing means biases the ends of the grip elements opposite the gripping portion ends toward one another so that said gripping portions are biased away from one another as said spherically-shaped portion acts as a fulcrum.

14. A clamp assembly as defined in claim 13 wherein said biasing means includes an elastomeric band positioned about so as to tightly encircle said grip element ends opposite the gripping portion ends.

15. A clamp for clamping two sporting accessories together in a sporting environment comprising:

base means for attachment in a stationary relationship to a first of two sporting accessories;

grip means mounted on said base means and including gripping portions which are movable toward one another to grip the second of the two sporting accessories therebetween and being movable with respect to said base means in frictional engagement therewith;

means for resiliently biasing said gripping portions toward a separated configuration;

means for holding and moving said gripping portions toward one another in opposition to said means for resiliently biasing so that the second of the two sporting accessories may be tightly clamped between said gripping portions while causing said gripping portions to be frictionally engaged upon said base means sufficient to prevent movement of said gripping portions with respect to said base means to thereby hold the second of the sporting accessories in a stationary position with respect to the base means; and said means for resiliently biasing and said means for holding and moving cooperating to restrict movement of said gripping portions on said base means when said gripping portions are not tightly clamped upon the second sporting accessory.

* * * * *